Patented Dec. 31, 1940

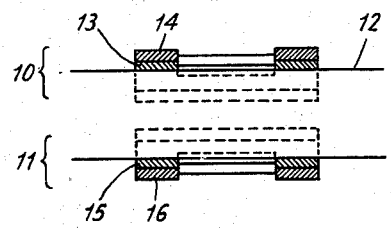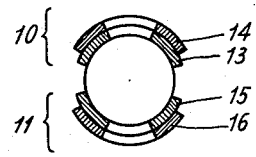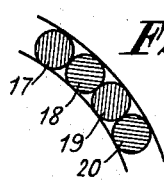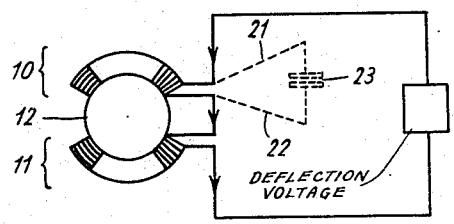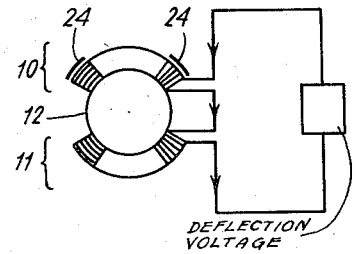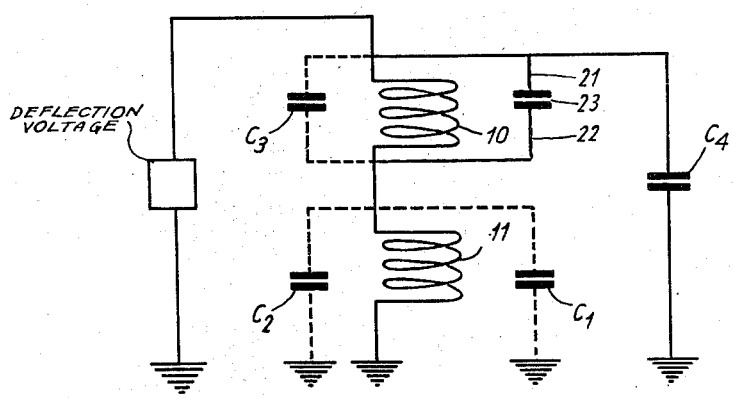

2,227,053

UNITED STATES PATENT OFFICE 2,227,053

MAGNETIC COIL FOR DEVIATING CATHODE RAYS

Robert Andrieu and Rudolf Schienemann, Berlin, Germany, assignors to Telefunken Gesellschaft für Drahtlose Telegraphie m. b. H., Berlin, Germany, a corporation of Germany Application March 26, 1936, Serial No. 70,931
In Germany March 28, 1935

5 Claims. (Cl. 250—27)

The invention relates to a magnet coil to be used for deviating cathode rays especially for the purpose of television. Such coils when in use cause difficulties which as extensive investigations have shown, are due to the various conditions in the natural and ground capacities of the two coil halves.

According to the invention, the said disturbances are avoided by influencing the distribution of the capacity determined by the shape and location of the coils, by means of additional capacitances and/or by different shaping of the two coil halves.

Several embodiments of the invention will be described in the following with reference to the accompanying drawing in which they are schematically shown.

In the drawing, Figs. 1 and 2 show elevation and end views in section of the coil structure used in cathode ray tubes;

Fig. 3 shows an enlarged end section of a portion of one of the coils;

Fig. 4 shows diagrammatically the coil structures with their associated distributed capacities and one embodiment of applicants' invention;

Fig. 5 shows schematically one embodiment of applicants' invention, and

Fig. 6 shows schematically another embodiment of applicants' invention.

Figures 1 and 2 show in cross section the shape and arrangement of two deviation coils 10 and 11 placed around the glass vessel 12 of a cathode ray tube. Each coil 10 and 11 consists of several windings of which only two are represented in the Figures 1 and 2, and designated by 13 and 14, and 15, 16 respectively. As is seen in Figure 3, within each winding layer the windings may be divided into winding packages 17—20.

The fact that various capacitive conditions exist in a pair of deviation coils can be readily recognized when viewing Figure 4. This figure again shows the two coil halves 10, 11, whereby the lower coil may be grounded at its lower end, and it be furthermore assumed that no stray exists between the individual turns of each coil half.

With these presumptions presenting the simplest conditions that can be assumed, the ground capacity of the lower coil is to be represented by a condenser $C_1$ connected to the upper end of the lower coil half. The natural capacity of the lower coil half represented by the condenser $C_2$, is likewise situated between the connection point of both coil halves and the ground. The natural capacity of the upper coil half is represented by a condenser $C_3$ placed in parallel to the upper coil half, and the ground capacity of the upper coil half is indicated by a condenser $C_4$. However, the latter is placed in parallel to the two coil halves, instead of being parallel to the one only as in the case of condenser $C_1$ representing the ground capacity of the lower coil half. As Figure 4 indicates, the capacitive conditions in both coils are in fact greatly different from each other as was to be expected in view of the fact that the distance of the two coil halves from the grounded wall of the apparatus is almost the same. Only on the basis of this inventive discovery has it now become possible to eliminate the aforementioned disturbances.

According to Figure 5 these disturbances are overcome in that a condenser 23 is placed in parallel to the coil 10 across the connection lines 21, 22 shown in dash lines. In Figure 4, this condenser is likewise shown in dash lines together with its connection lines, and it can be seen that it is this condenser by means of which only symmetry in the capacitive conditions of the two coil halves can only be obtained. If it is intended to still further extend the compensation of the conditions of capacity beyond the possibility existing in accordance with the substitution circuit according to Figure 4, and obtained as above pointed out by assuming the simplest conditions, condensers may also be placed in parallel to parts of one or of both coils.

An additional distributed capacity of the upper one of the two deflection coils may be obtained as shown in Fig. 6 for providing in the vicinity of the coils, as for example, closely adjacent to its surface, an ungrounded conductive layer 24 which can be of metal. This metal layer is provided only on the parts of the windings extending parallel to the axis of the glass tube 12 in order not to short-circuit the entire coil. A metal surface, of course, can be positioned between the coil and glass tube or between individual layers of the capacity. In each case, the result is the same, that is, the metal surface increases the distributed capacity existing between the individual windings.

The capacity between individual coil turns, and individual winding packages in accordance with Figure 3, or between the winding layers according to Figures 1 and 2, may also be influenced by choosing a different distance between the winding packages, and/or between the winding layers in both coils. The distance between the winding layers may also be stepped up within the coil.

The described magnet coil has a particular advantage especially in those circuit arrangements in which the coils perform temporarily free oscillations, such as for instance in the case of a circuit according to application Ser. No. 61,499, filed Jan. 30, 1936, entitled "Oscillation producing system" of Robert Andrieu.

What we claim is:

1. In a cathode ray deflecting system, a split magnetic coil of two portions, one of said portions having a larger distributed capacity than the other portion, and metal sheet means to increase the capacity across the portion having the smaller distributed capacity to provide an electrically balanced network with respect to a predetermined equi-potential surface.

2. In a cathode ray deflecting system, a split magnetic coil of two parts arranged coaxially about a predetermined axis, said parts having normally unequal distributed capacities with respect to a predetermined equi-potential plane, and spacing means to alter the distance of one of said parts from the axis to equalize the distributed capacitance of both coils.

3. In a cathode ray deflecting system, a split magnetic coil of two parts arranged coaxially about a predetermined axis, said parts having normally unequal distributed capacities with respect to a predetermined equi-potential plane, and conductive means positioned upon one of said parts and extending in a direction parallel to said predetermined axis to equalize the distributed capacitance of both coils.

4. In a cathode ray deflecting system, a pair of magnetic deflecting coils in juxtaposition to each other, said coils each having different distributed capacity, a connection for serially connecting the said coils, and metallic means to supplement the distributed capacity of one of said coils to provide an electrically balanced network with respect to a predetermined equi-potential surface.

5. In a cathode ray deflecting system, a pair of magnetic deflecting coils in juxtaposition to each other, said coils each having different distributed capacity, a connection for serially connecting the said coils, and a capacity element connected in parallel with one of said coils to provide an electrically balanced network with respect to a predetermined equi-potential surface.

ROBERT ANDRIEU.
RUDOLF SCHIENEMANN.